(12) United States Patent
Stalz-John et al.

(10) Patent No.: US 11,978,218 B2
(45) Date of Patent: May 7, 2024

(54) METHOD FOR DETECTING AND RE-IDENTIFYING OBJECTS USING A NEURAL NETWORK

(71) Applicant: Robert Bosch GmbH, Stuttgart (DE)

(72) Inventors: Denis Stalz-John, Lotte (DE); Tamas Kapelner, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 856 days.

(21) Appl. No.: 17/073,780

(22) Filed: Oct. 19, 2020

(65) Prior Publication Data

US 2021/0122052 A1 Apr. 29, 2021

(30) Foreign Application Priority Data

Oct. 25, 2019 (DE) .......................... 102019216511.7

(51) Int. Cl.
| | |
|---|---|
| *B25J 9/16* | (2006.01) |
| *G06F 18/22* | (2023.01) |
| *G06F 18/24* | (2023.01) |
| *G06N 3/08* | (2023.01) |
| *G06T 7/20* | (2017.01) |
| *G06T 7/246* | (2017.01) |
| *G06V 10/20* | (2022.01) |
| *G06V 10/82* | (2022.01) |
| *G06V 20/52* | (2022.01) |

(52) U.S. Cl.
CPC ............ *G06T 7/246* (2017.01); *B25J 9/1697* (2013.01); *G06F 18/22* (2023.01); *G06F 18/24* (2023.01); *G06N 3/08* (2013.01); *G06T 7/20* (2013.01); *G06V 10/255* (2022.01); *G06V 10/82* (2022.01); *G06V 20/52* (2022.01)

(58) Field of Classification Search
CPC ........ B25J 9/1697; G06F 18/22; G06F 18/24; G06N 3/08; G06T 7/20
See application file for complete search history.

(56) References Cited

U.S. PATENT DOCUMENTS

| | | | |
|---|---|---|---|
| 2019/0205643 A1* | 7/2019 | Liu ........................ | G06N 3/045 |
| 2020/0097742 A1* | 3/2020 | Ratnesh Kumar ..... | G06V 20/52 |
| 2020/0294257 A1* | 9/2020 | Yoo ........................ | G06V 10/25 |
| 2020/0294310 A1* | 9/2020 | Lee ........................ | G06V 10/82 |

* cited by examiner

*Primary Examiner* — Kira Nguyen
(74) *Attorney, Agent, or Firm* — NORTON ROSE FULBRIGHT US LLP; Gerard A. Messina

(57) ABSTRACT

A method for detecting and re-identifying objects using a neural network. The method includes the steps: extracting features from an image, the features comprising information about at least one object in the image; detecting the at least one object in the image using an anchor-based object detection based on the extracted features, classification data being determined by a classification for detecting the object with the aid of at least one anchor and regression data being determined by a regression; and re-identifying the at least one object by determining embedding data based on the extracted features, the embedding data representing an object description for the at least one feature of the image.

10 Claims, 1 Drawing Sheet

METHOD FOR DETECTING AND RE-IDENTIFYING OBJECTS USING A NEURAL NETWORK

CROSS REFERENCE

The present application claims the benefit under 35 U.S.C. § 119 of German Patent Application No. DE 102019216511.7 filed on Oct. 25, 2019, which is expressly incorporated herein by reference in its entirety.

FIELD

The present invention relates to a method for detecting and re-identifying objects using a neural network, to a neural network, to a control method, to a computer program and to a machine-readable storage medium.

BACKGROUND INFORMATION

When using an external tracking algorithm for detecting and re-identifying objects, the external tracking algorithm must find again a box with the same object in successive images, the so-called frames. There are various approaches which for example compare the content of the boxes to one another or take the position, size and the aspect ratio into consideration. These methods are often error-prone if objects are near one another or objects are for a time span partially or entirely concealed.

There may therefore exist the desire for an improved method for detecting and re-identifying objects using a neural network.

SUMMARY

Specific embodiments of the present invention and expedient developments of the present invention derive from the description herein and the figures.

According to one aspect of the present invention, a method for detecting and re-identifying objects using a neural network is provided. In an example embodiment of the present invention, the method includes the following steps: Extracting features from an image, the features comprising information about at least one object in the image. Detecting the at least one object in the image using an anchor-based object detection based on the extracted features, classification data being determined by a classification for detecting the object with the aid of at least one anchor and regression data being determined by a regression. Re-identifying the at least one object by determining embedding data based on the extracted features, the embedding data representing an object description for the at least one feature of the image.

The term "feature," as it is used here, comprises the result of the totality of operations in a neural network, on the basis of which regression data, classification data and embedding data are determined. These operations receive as input a specific pixel or a specific region of the image, the entire neural network containing at least one image as input.

The term "classification," as it is used here, comprises a prediction of classification, in other words, whether an object is located in the image within the anchor and, if so, to which class the object belongs.

The term "regression," as it is used here, comprises a refinement of anchor coordinates, in other words, what shifting and scaling of the anchor is necessary so that an anchor box of the anchor fits precisely on the object in the image.

The term "embedding data," as it is used here, comprises data that represent a description for a specific pixel or a region of the image. The embedding data comprise in particular at least one embedding vector. This description is as definite as possible for the given content of the pixel or of the region. Thus it is possible to perform a similarity comparison to other pixels or regions on the basis of the embedding data. The embedding data are also referred to as embeddings. In the re-identification of objects using embeddings, a neural network is taught to output specific embedding data, for example a specific embedding vector, for a pixel or a region. On the basis of a similarity of the embedding data, that is, the content that they represent, it is thus possible to re-identify objects in different frames, even across multiple camera views.

The term "object re-identification," as it is used here, designates a re-identification of objects in different cameras or frames. In the re-identification of objects using embeddings, the neural network is taught to output a description for a specific pixel or a region. This description is as definite as possible for a given content and may be obtained on the basis of these data as a similarity comparison to another pixel or region. Via a similarity between different embeddings, it is possible to determine an affiliation with the same object.

The at least one object is preferably tracked in successive images based on the determined classification data, the determined regression data and the determined embedding data.

The term "tracking," as it is used here, comprises a use of an algorithm and/or system in addition to the object detection, which is in particular connected downstream from an object detector, and which processes the detections in successive images, which are also called frames. Tracking and object detection are independent of one another, for example. A tracker that is designed to perform the tracking may work with classical as well as with deep learning-based algorithms.

Preferably, the classification, the regression and the determination of the embedding are trained for each anchor.

In this manner, objects may be re-identified in different images.

Preferably, the at least one object is re-identified in different camera views.

Preferably, the embedding data comprise at least one embedding vector. Preferably, the length of all embedding vectors is identical. The length of the embedding vectors is preferably variable.

Preferably, the image is divided virtually into cells, and at least one anchor is assigned to each cell. In particular, the anchors are prototypes for detected boxes, in other words, transformed anchors in the end form the output of the neural network.

At least two groups of neurons in the neural network belong to each anchor. A neuron is trained to perform the classification, in which a classification of the object is predicted. In other words, a determination is made as to whether an object is located in the image within the anchor and, if so, whether it belongs to one of the classes defined in training. A class is designated "person" for example. A neuron is trained to perform the regression, in which coordinates of the anchor are refined.

The refinement comprises in particular information about what shifting and scaling of the anchor is necessary so that the anchor, or in other words the anchor box, fits precisely onto the object in the image.

The object description is preferably as definite as possible for the content of the object.

This removes the limitation that the tracking algorithm either has access only to very simple properties of the objects and that thus a new identification must occur for the most part on the basis of properties of the box, or in particular that the tracking algorithm for itself must extract features from the image in order to determine more complex object properties, which requires resource and computing expenditures.

There thus exists the possibility to re-identify the same object in different cameras.

In this manner, embeddings and anchor-based object detection methods are combined with the goal of re-identifying objects in different images.

The task of tracking is thus simplified since the embeddings provide direct information about an identity of the object.

In this manner, the object is described discriminatively by the embeddings. These may thus also be used for re-identifying the object outside of the tracking. The re-identification results in a reduction of the computing expenditure. Computing expenditure may be saved, for example, in a person re-identification, in which persons must be re-identified in different cameras at different points in time.

In this manner, an improved method for detecting and re-identifying objects using a neural network is provided.

In a preferred specific embodiment of the preset invention, the method comprises the step of tracking the at least one object in successive images based on the determined classification data, the determined regression data and the determined embedding data.

Preferably, the at least one object is re-identified in different camera views.

In this manner, an improved method is provided for detecting and re-identifying objects using a neural network.

In one preferred specific embodiment of the present invention, the detection of the at least one object and the determination of the embedding data are performed at the same time on the basis of the same features and using the same neural network.

In this manner, embeddings and anchor-based object detection methods are combined with the goal of re-identifying objects in different images.

In one preferred specific embodiment of the present invention, the embedding data are determined by an embedding layer, the embedding layer being trained using a loss function.

The loss function preferably comprises the addition of a loss.

The anchors are preferably positive anchors or negative anchors.

A positive anchor designates an anchor whose relative overlap with an object in the image is greater than a previously defined threshold value. Since there are anchors having the same position in the image but different sizes, it may happen that an object has more than one positive anchor as long as the condition of the threshold value respectively applies for each anchor.

A negative anchor designates an anchor, in which no object is located within the anchor area or whose relative overlap with the object in the image is smaller than a previously defined threshold value.

The loss is preferably learned only for positive anchors.

The loss preferably fulfills the following conditions. If an object occurs in different anchors, the corresponding embedding features should have as little distance from one another as possible in accordance with a metrics. A value that is determined by the metrics from two embedding vectors should be as large as possible if the embedding vectors are based on different objects.

The loss preferably comprises a pull loss, which indicates that the embedding data are to be assigned to the same object, and a push loss, which indicates that the embedding data are to be assigned to different objects.

Preferably, multiple views of the same object are known so that the pull loss can take effect between multiple views of the same object.

An example of a pull loss is described as follows:

$$L_{pull} = \frac{1}{N}\sum_{k=1}^{N}[(e_{ik} - e_{jk})^2]$$

An example of a push loss is described as follows:

$$L_{push} = \frac{1}{N(N-1)}\sum_{k=1}^{N}\sum_{\substack{l=1 \\ l \neq k}}^{N}\max(0, \Delta - |e_{ik} - e_{jl}|)$$

$e_{jk} \in P(k)$ is an embedding vector for the object k and the anchor j, and one of the two loss functions is applied to each pair of positive anchors. $\Delta$ is a hyper parameter of the training, which determines the distance between embeddings of different objects.

Preferably, an output of the embedding layer has the same number of vectors as the number of the anchors of the output of the classification.

In one preferred specific embodiment of the present invention, the pull loss function comprises a metrics, the metrics comprising an L2norm or a cosine distance. Fundamentally, the pull loss function may be a function d( ), which satisfies the following properties:
1. $d(x,y) \geq 0$
2. $d(x,y) = 0 \Leftrightarrow x = y$
3. $d(x,y) = d(y,x)$
4. $d(x,z) \leq d(x,y) + d(y,z)$ where x and y are elements of an arbitrary set, in particular embedding vectors.

In one preferred specific embodiment of the present invention, the embedding layer is learned with object re-identification, distances being used between embedding data, in particular embedding vectors, of detected objects.

In one preferred specific embodiment of the present invention, the embedding layer is learned with temporal detection, the embedding data of detected objects being used as input for a tracking algorithm.

The term "temporal detection," as it is used here, comprises a tracking of objects within a sequence of successive frames.

Preferably, a detection of objects with subsequent tracking is used for this purpose, the detections being based on features of at least one image.

According to one aspect of the present invention, a neural network comprises a classification layer, which is designed to determine classification data for detecting at least one object in an image using an anchor-based object detection, a regression layer, which is designed to determine regression data for detecting at least one object in an image using an anchor-based object detection, an embedding layer, which is designed to re-identify the at least one object by determining embedding data based on the extracted features, the embedding data representing an object description for the at least one feature of the image.

Preferably, the deep neural network is used to detect objects in an image and to re-identify these using embeddings. The objects to be detected and re-identified preferably comprise vehicles and/or traffic signs.

According to one aspect of the present invention, a control method for an at least partially autonomous robot comprises the steps: Receiving image data of the at least partially autonomous robot, the image data representing in particular a surroundings of the robot. Applying a method for detecting and re-identifying objects, as it is described here, to the received image data.

Controlling the at least partially autonomous robot on the basis of the detected and re-identified objects.

According to one aspect of the present invention, a computer program is provided, comprising commands that prompt a computer, when executing the computer program, to implement a method as it is described here.

According to one aspect of the present invention, a machine-readable storage medium is provided, on which the computer program, as it is described here, is stored.

Further measures improving the present invention are presented in greater detail below with reference to figures together with the description of the preferred exemplary embodiments of the present invention.

DETAILED DESCRIPTION OF EXAMPLE EMBODIMENTS

Figure 1:
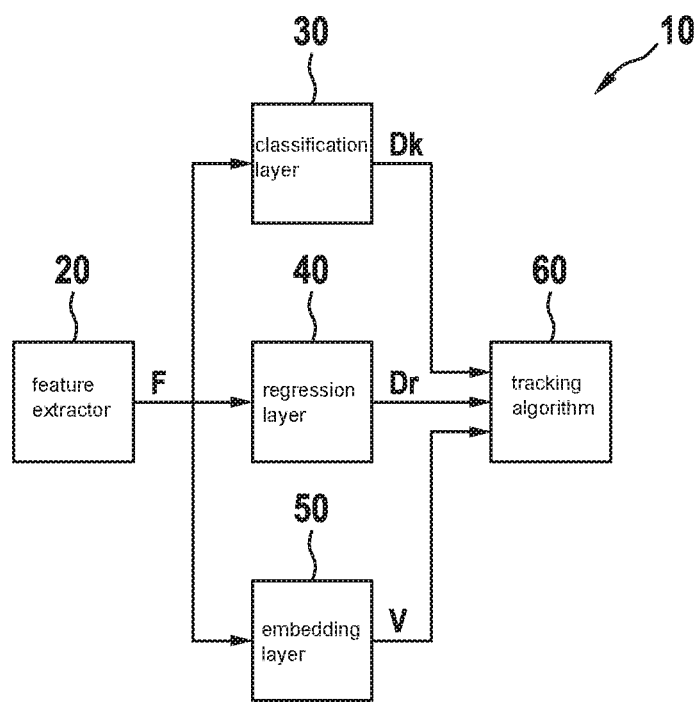
FIG. 1 shows a neural network for detecting and re-identifying objects in an image.

FIG. 1 shows a neural network 10 for detecting and re-identifying objects in an image. Neural network 10 comprises a feature extractor 20, which is designed to extract features F from an image, features F comprising information about at least one object in the image.

The neural network further comprises a classification layer 30, a regressions layer 40, an embedding layer 50 and a tracking algorithm 60. Feature extractor 20 supplies classification layer 30, regression layer 40 and embedding layer 50 with the extracted features F. Classification layer 30 is designed to classify at least one object in the image using an anchor-based object detection and to determine classification data Dk in the process. Regression layer 40 is designed to detect at least one object in the image using an anchor-based object detection and to determine regression data Dr in the process. Embedding layer 50 is designed to determine at least one embedding vector V based on the extracted features F in order to re-identify the at least one object in multiple successive images, the at least one embedding vector representing an object description for the at least one feature F of the image.

The determined classification data Dk, regression data Dr and the at least one embedding vector V are subsequently transmitted to tracking algorithm 60. Tracking algorithm 60 is designed to track the at least one object in successive images based on the determined classification data Dk, the determined regression data Dr and the determined at least one embedding vector V.

Figure 2:
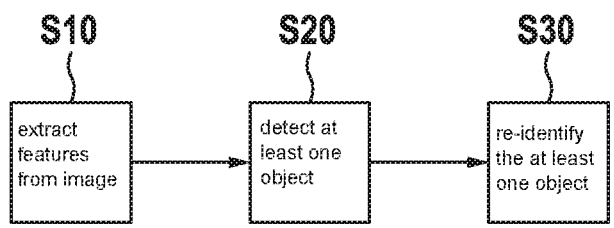
FIG. 2 shows a method for detecting and re-identifying objects in an image.

FIG. 2 shows a method for detecting and re-identifying objects using a neural network, comprising the following steps. In a first step S10, features F are extracted from an image, features F comprising information about at least one object in the image. In a second step S20, the at least one object in the image is detected using an anchor-based object detection based on the extracted features F, classification data Dk being determined by a classification for detecting the object with the aid of at least one anchor and regression data Dr being determined by a regression. In a third step S30, the at least one object is re-identified by determining at least one embedding vector V on the basis of the extracted features F, the at least one embedding vector V representing an object description for the at least one feature F of the image.

What is claimed is:

1. A method using a neural network, the method comprising the following steps:
extracting features from each of a plurality of images, the features including information about objects in the images;
detecting the objects in the images using an anchor-based object detection based on the extracted features, the detecting including:
determining classification data by a classification of the objects using at least one anchor;
determining regression data by a regression; and
determining, respectively for each of the images, a respective embedding data vector that describes one of the objects based on the extracted features; and
for each respective one of at least one of the objects, tracking the respective object between different ones of the images based on a degree of similarity between the embedding data vectors respectively determined for the different ones of the images, the tracking including identifying that the object identified as being in the different ones of the images is the same.

2. The method as recited in claim 1, wherein the images between which the respective object is tracked are temporally successive images, and the tracking is further based on the determined classification data and the determined regression data.

3. The method as recited in claim 1, wherein the detecting of the at least one object and the tracking occur using the same neural network.

4. The method as recited in claim 1, wherein the embedding data vector is determined by an embedding layer learned with a loss function.

5. The method as recited in claim 4, wherein the loss function includes a metrics, the metrics including an L2norm or a cosine distance.

6. The method as recited in claim 4, wherein the embedding layer is learned with object re-identification, distances being used between the embedding data vectors of detected objects.

7. The method as recited in claim 4, wherein the embedding layer is learned with temporal detection, the embedding data of detected objects being used as input for a tracking algorithm.

8. A neural network, comprising:
a feature extractor configured to extract features from each of a plurality of images, the features including information about objects in the images;

a classification layer configured to determine classification data for detecting the objects in the images using an anchor-based object detection;

a regression layer configured to determine regression data for detecting the objects in the images using the anchor-based object detection; and an embedding layer configured to determine, respectively for each of the images, a respective embedding data vector that describes one of the objects based on the extracted features;

wherein the neural network is configured to, for each respective one of at least one of the objects, track the respective object between different ones of the images based on a degree of similarity between the embedding data vectors respectively determined for the different ones of the images, the tracking including identifying that the object identified as being in the different ones of the images is the same.

9. A control method for an at least partially autonomous robot, the method comprising the following steps:

receiving image data of the at least partially autonomous robot, the image data including a plurality of images representing a surroundings of the robot;

applying a neural network method using a neural network, the neural network method including:

extracting features from each of the plurality of images, the features including information about objects in the images;

detecting the objects in the images using an anchor-based object detection based on the extracted features, the detecting including:

determining classification data by a classification of the objects using at least one anchor;

determining regression data by a regression; and determining, respectively for each of the images, a respective embedding data vector that describes one of the objects based on the extracted features; and for each respective one of at least one of the objects, tracking the respective object between different ones of the images based on a degree of similarity between the embedding data vectors respectively determined for the different ones of the images, the tracking including identifying that the object identified as being in the different ones of the images is the same; and controlling the at least partially autonomous robot based on the tracking.

10. A non-transitory machine-readable storage medium on which is stored a computer program that is executable by a computer, and that, when executed, causes the computer to perform a method using a neural network, the method comprising the following steps:

extracting features from each of a plurality of images, the features including information about objects in the images;

detecting the objects in the images using an anchor-based object detection based on the extracted features, the detecting including:

determining classification data by a classification of the objects using at least one anchor; and determining regression data by a regression; and determining, respectively for each of the images, a respective embedding data vector that describes one of the objects based on the extracted features; and for each respective one of at least one of the objects, tracking the respective object between different ones of the images based on a degree of similarity between the embedding data vectors respectively determined for the different ones of the images, the tracking including identifying that the object identified as being in the different ones of the images is the same.

* * * * *